Dec. 22, 1931.  S. KNEASS, JR  1,837,779
HEAT TREATING FURNACE
Filed Jan. 3, 1929   6 Sheets-Sheet 4

INVENTOR

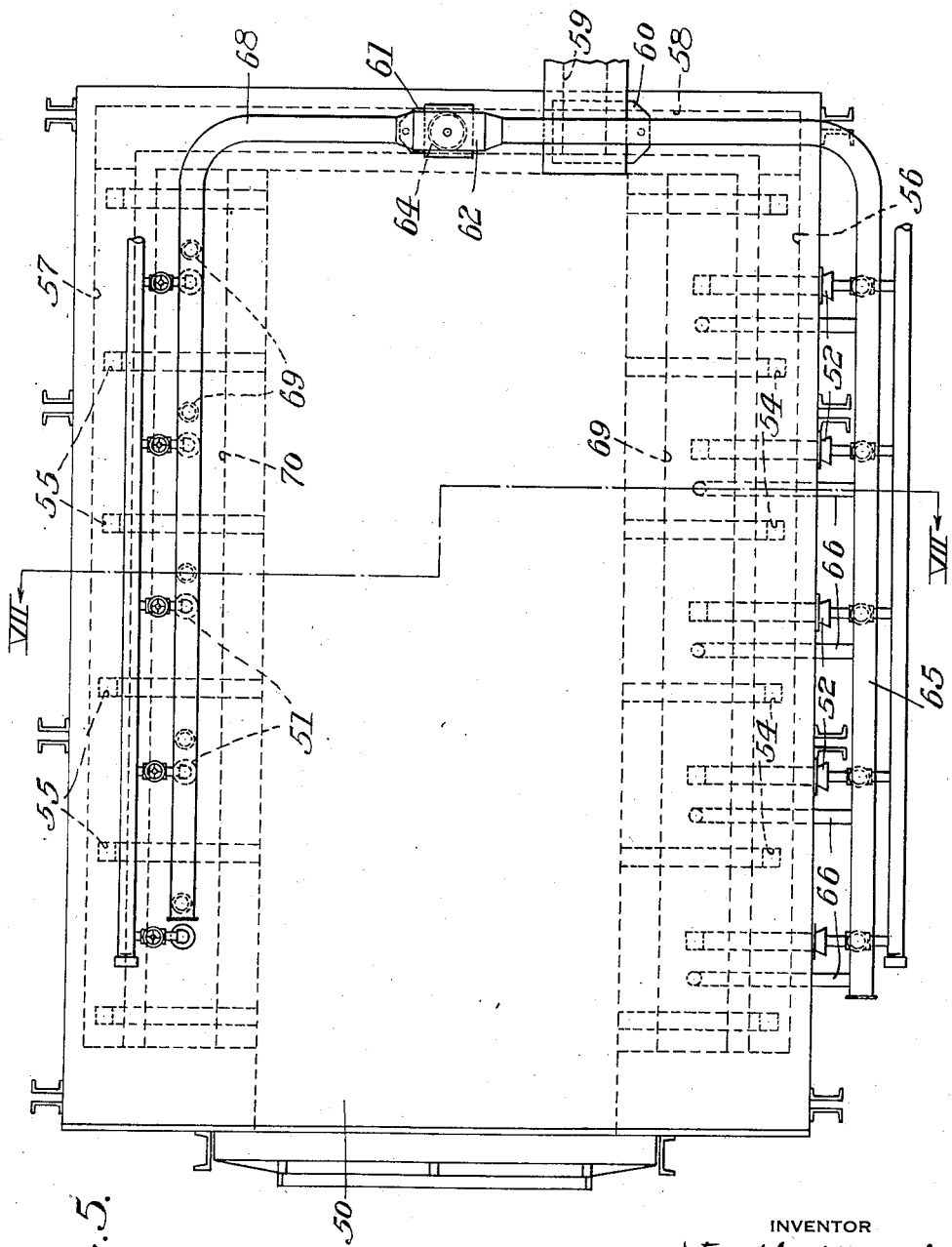

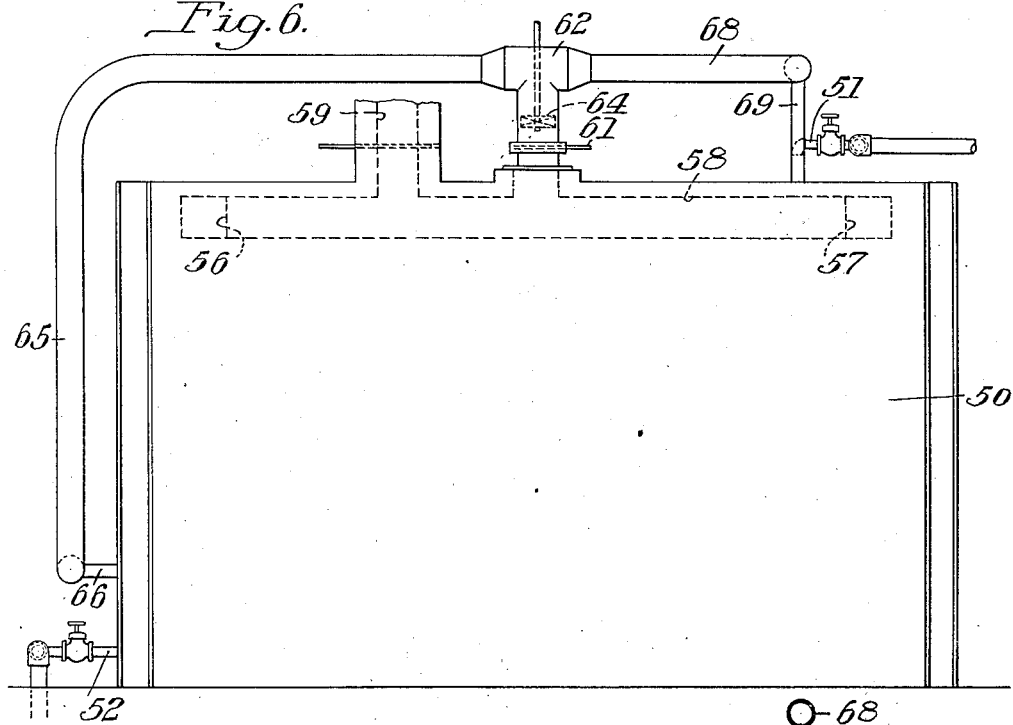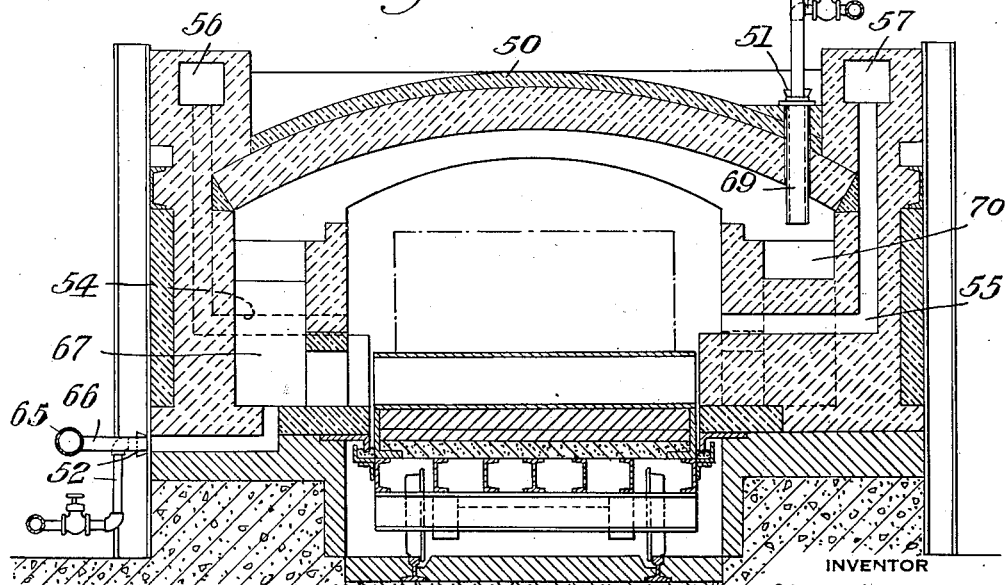

Patented Dec. 22, 1931

1,837,779

UNITED STATES PATENT OFFICE

STRICKLAND KNEASS, JR., OF SEWICKLEY, PENNSYLVANIA, ASSIGNOR TO COSTELLO ENGINEERING COMPANY, OF PITTSBURGH, PENNSYLVANIA, A CORPORATION OF PENNSYLVANIA

HEAT TREATING FURNACE

Application filed January 3, 1929. Serial No. 330,040.

My invention relates to heat treating furnaces and methods of operating the same, and more particularly to annealing and normalizing furnaces adapted for use as drawing furnaces.

In heat treating furnaces, particularly furnaces operating at high temperatures, there is a tendency for zones or pockets of different temperatures to exist in different parts of the furnace unless provision is made for ensuring a continuous circulation of the gases throughout the entire furnace. For many heat treating purposes it is desirable that uniform temperature be maintained throughout the furnace. Where a container for material being treated or the material itself is allowed to rest directly on the bottom of the furnace there is a possibility that the temperature below such container or material is less than the temperature above the same. Unless uniform circulation of the gases in the furnace is obtained, the fuel from the burners does not have an ample opportunity to mix with the products of combustion already present in the furnace and localized hot and cold spots are liable to develop.

Heretofore annealing and normalizing operations have been conducted in one furnace and drawing operations have been conducted in a separate furnace. It has been impossible to carry on the drawing operations in the furnace used for annealing or normalizing due to the fact that the furnace is heated to a considerably higher temperature during the annealing and normalizing operations than is used during the drawing operations. As the annealing and normalizing operation takes place before the drawing operation, difficulty is had in obtaining a circulation of gases in the furnace during the drawing operation. The hot gases tend to gather at the top of the furnace and cooler gases collect at the bottom of the furnace. The change in temperature between the top of the furnace and the bottom of the furnace is approximately 2° per inch of height of the furnace. As the hotter gases are collected at the top of the furnace, there is no tendency for gas circulation in the furnace since the lighter gases are maintained at the top of the furnace. Such an uneven distribution of temperature in a large furnace is liable to be sufficiently great to cause an uneven drawing of the contents of a box or other container placed in the furnace.

I provide a heat treating furnace having provision for insuring a uniform and continuous circulation of the gases throughout the furnace. The burners are positioned about the walls of the furnace so that the fuel injected by them acts in the same rotative sense for establishing and maintaining circulating currents of gas. The take-off ducts for the gases are disposed so that they do not interfere with the circulatory motion of such gases.

By providing a secondary circulating system the same furnace is capable of annealing and/or normalizing operations and for drawing operations. The secondary system removes the heated gases from one part of the furnace and re-introduces them into the furnace in such manner as to insure a circulation thereof throughout the furnace so that the lower part of the furnace is at substantially the temperature of the upper part of the furnace. The secondary circulating system is disposed to maintain the same direction of circulation of the gases within the furnace as do the burners. The accompanying drawings illustrate certain present preferred embodiments of the invention, in which Figure 1 is a plan view of a furnace embodying my invention;

Figure 5 is a plan view of another modified form of furnace;

Figure 6 is an end view thereof; and

Figure 7 is a transverse sectional view of the furnace taken along the section line VII—VII of Figure 5.

Figure 1:
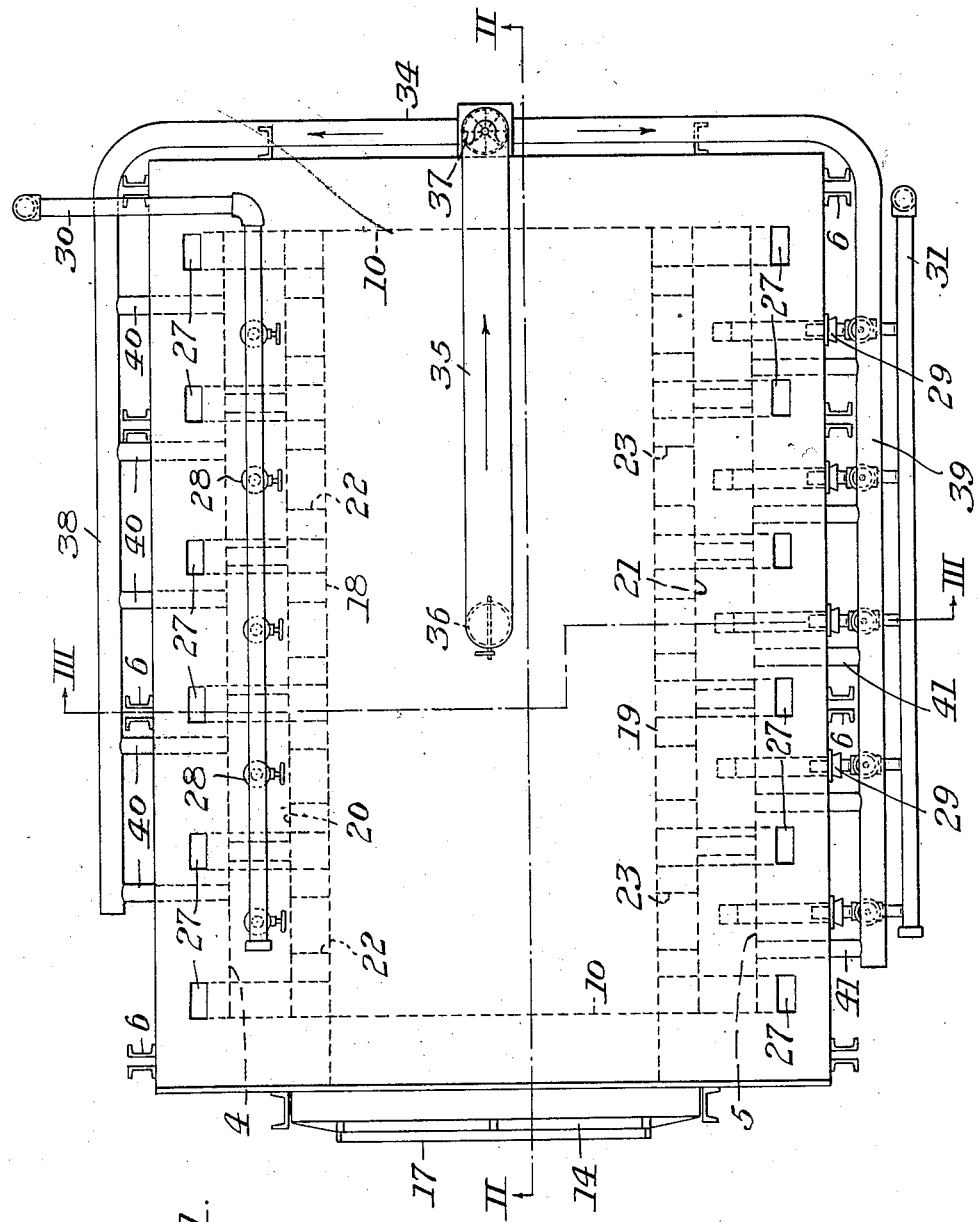
Figure 2:
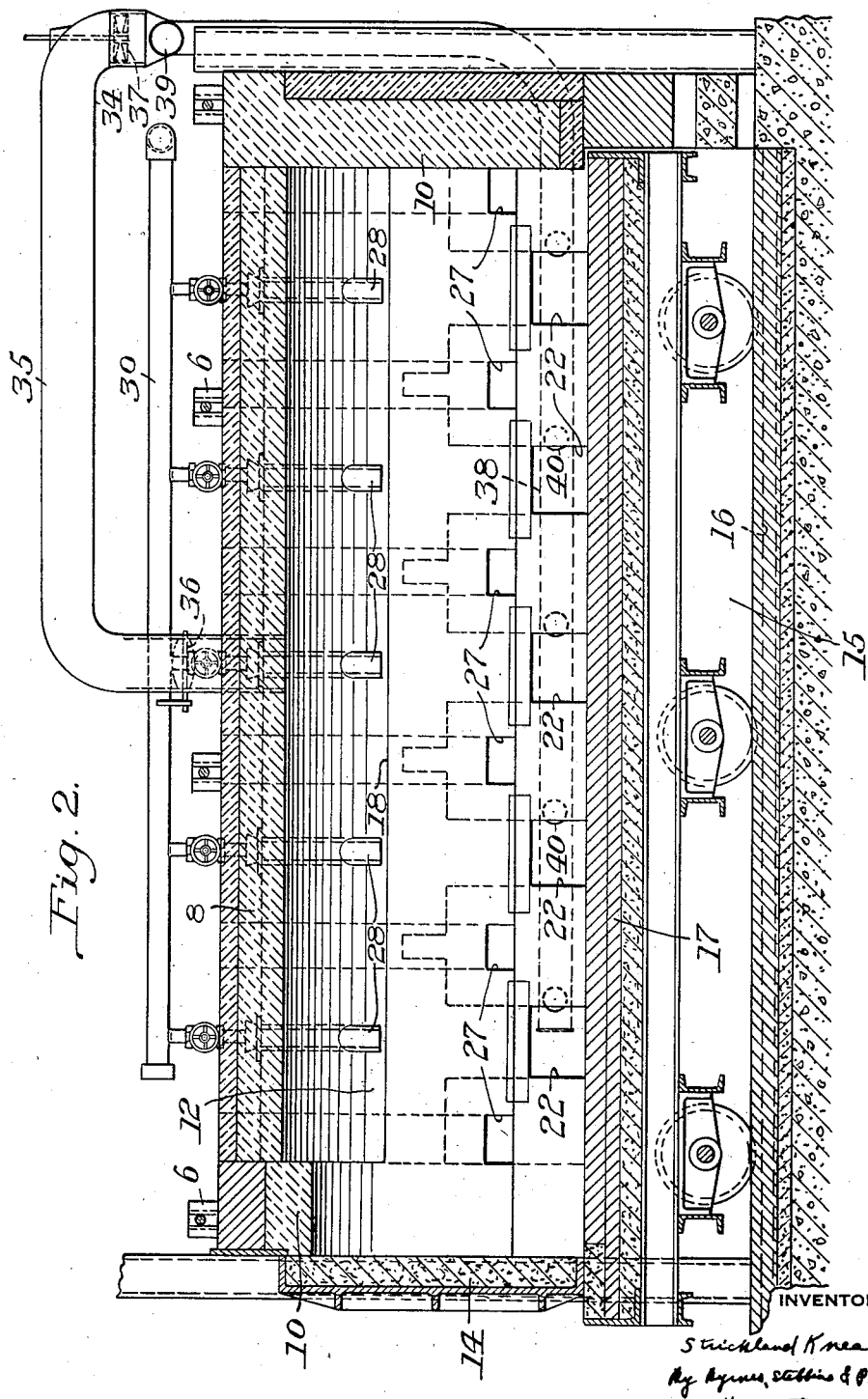
Figure 2 is a longitudinal sectional view thereof, taken along the section line II—II of Figure 1.
Figure 3:
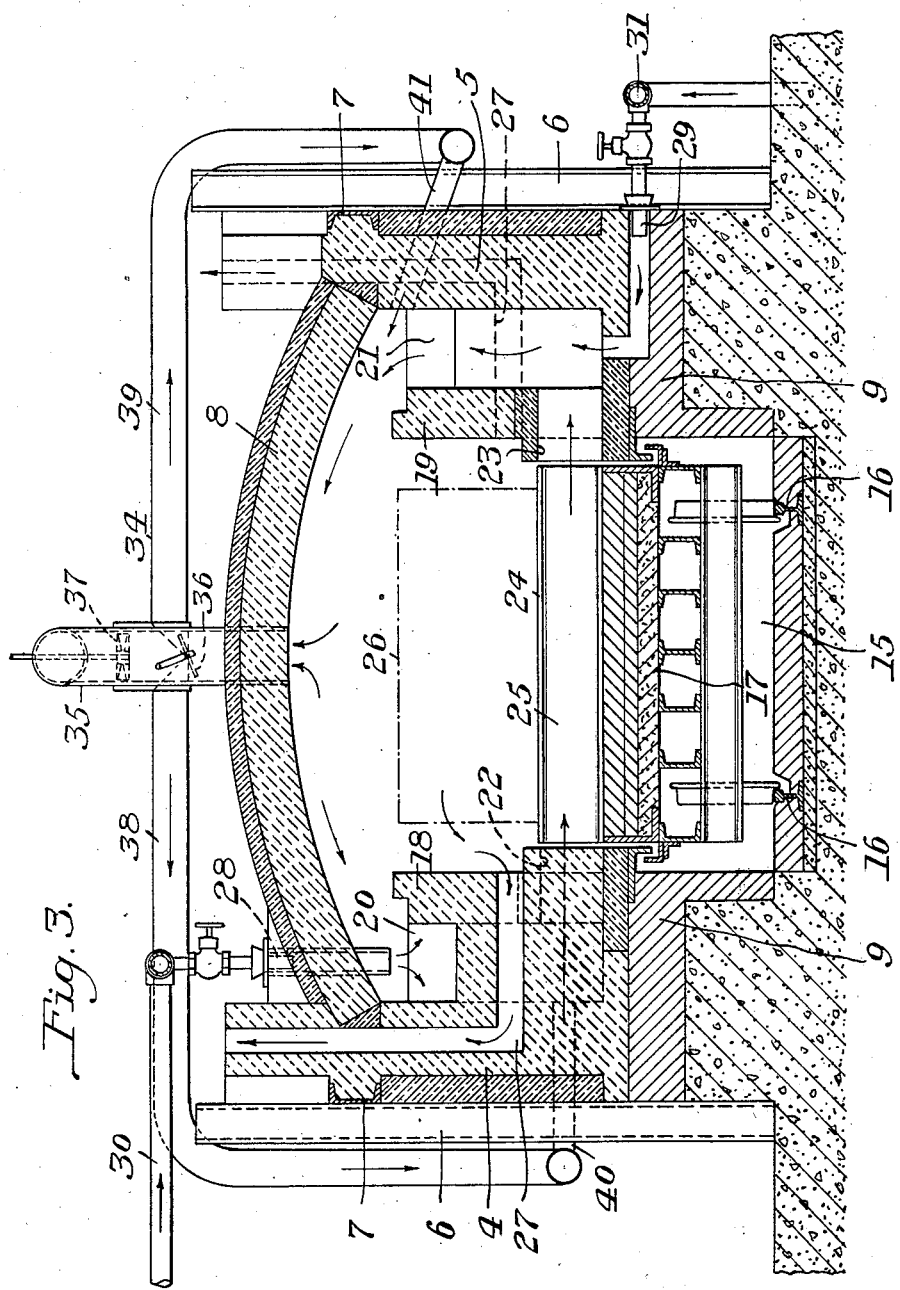
Figure 3 is a transverse sectional view of the furnace taken along the section line III—III of Figure 1.

Referring to Figures 1 to 3, there is shown a heat treating furnace comprising side walls 4 and 5 of masonry, and metallic reinforcing beams 6 and 7. An arched roof 8 extends between the side walls and, with a bottom or floor 9 and end walls 10, encloses a heating chamber 12. The front wall 10 is provided with a door 14 through which material is inserted into and withdrawn from the chamber 12.

The bottom 9 is provided with a depressed portion 15 in which a track 16 is mounted. The depth of the depressed portion 15 is preferably such as to bring the top of a car 17 resting on the track 16 substantially level with the remainder of the bottom 9. Longitudinally extending fire walls 18 and 19 are disposed in the chamber 12 above the vertically extending walls of the depressed portion 15. Spaces 20 and 21 are provided between the walls 18 and 4 and 19 and 5, respectively. Passageways 22 and 23 are formed in the fire walls 18 and 19, respectively, for connecting the spaces 20 and 21, respectively, with the central portion of the chamber 12.

The car 17 is provided with a framework 24 defining a plurality of ducts 25 extending transversely of the car beneath a container 26, such as a box, containing objects being heat treated. When the ducts 25 are in alignment with the passageways 22 and 23, a plurality of continuous ducts are provided between the spaces 20 and 21 at the bottom of the furnace. The roof of the furnace is removed from the top of the box 26 far enough to provide a passageway for the circulation of gases above the box. The spaces 20 and 21 are open at the top of the furnace so that passageways are provided for a continuous circulation of flames and gases about the longitudinal axis of the furnace. It is to be understood that the material being treated can be piled directly on the car 17 without a box, if desired. The use of boxes and containers is sometimes dispensed with during drawing operations.

Outlet ducts 27 are provided in the fire walls 18 and 19 and extend across the spaces 20 and 21 and upwardly through the said walls 4 and 5 to the top of the furnace. It is to be understood that the outlet ducts 27 are connected to a stack not shown.

For heating the furnace a plurality of groups of burners 28 and 29 are provided. The several burners 28 extend downwardly through the roof 8 of the furnace and terminate in the space 20. The burners 28 are connected by a pipe line 30 to a source of fuel such as gas. The mouths of the burners 28 are directed downwardly in the space 20 in substantial parallelism to the walls 4 and 18. The fuel and flames forced into the space 20 create a pressure which tends to force the fuel and products of combustion outwardly through the openings 22 through the ducts 25 and the openings 23 into the space 21. The several burners 29 extend along the bottom 9 of the furnace and open upwardly into the space 21. They are supplied with fuel by a pipe line 31. Fuel fed into the space 21 from the burners 29 is given a direction substantially parallel to the walls 5 and 19, thereby inducing the circulation of gases upwardly through the space 21. As the circulation of the gases induced by the burners 29 is in the same rotational sense as the movement induced by the burners 28, a uniform circulation of gases throughout the length of the furnace is insured. Since the outlet ducts 27 communicate with the central portion of the chamber 12, the gases are compelled to travel over and/or around the top of the box 26 before the outlet ducts are reached. This construction insures that substantially the same temperature is maintained above and below the box 26, thereby insuring a uniform heat treatment of the contents of the box.

The fuel delivered to the furnace by the burners 28 and 29 is thoroughly mixed with the products of combustion and other gases present in the furnace during the circulatory movement of the gases and fuel. The thorough mixing of the fuel and gases insures a uniform distribution of temperature through out the furnace and prevents the formation of localized hot and cold pockets such as have heretofore existed in furnaces where poor circulation exists.

For normalizing operations a furnace temperature of from 1750 to 1800° F. may be desired. In annealing operations a temperature of from 1450 to 1600° F. may be desired. For drawing operations a temperature range between 900 and 1200° F. may be desired. As the drawing operation follows an annealing and/or a normalizing operation, the furnace temperature must be reduced before the drawing operation takes place. When it is desired to change from a normalizing and/or an annealing operation to a drawing operation, the fuel supplied by burners 28 and 29 is reduced to such an extent that the circulation of the gases through the furnace due to the action of the burners 28 and 29 is impaired. Under such conditions, there is a tendency for the hotter gases to collect at the top of the furnace and the cooler gases to collect at the bottom of the furnace with the result that the temperature of the box 26 is nonuniform. The temperature drop from the top to the bottom of such a furnace is approximately 2° per inch in height of the furnace.

To secure a uniform circulation of the gases in the furnace during the drawing operation, I provide a secondary circulating system 34. The secondary circulating system comprises a pipe 35 extending through the furnace roof 8 at substantially the center thereof. A damper 36 is placed in the pipe 35 above the top of the roof 8. The pipe 35 leads to a fan 37 mounted at the rear end of the furnace. From the fan 37 laterally extending ducts 38 and 39 lead to openings in the side walls 4 and 5, respectively. The duct 38 is connected to a plurality of horizontally extending jets 40. These jets extend through the side walls 4 and into the space 20, in communication with the openings 22 and the ducts 25 so that the gases blown into the furnace through the jets 40 tend to circulate through the gas paths controlled by the burners 28 and 29.

The duct 39 terminates in jets 41 extending through the side wall 5 at a slight angle to the horizontal. The jets 41 open into the space at the top of the furnace defined by the roof 8 and the top of the fire-wall 19. The angle of inclination of the jets 41 is such that gases discharged from them tend to travel along the roof 8 in the same path as the gases controlled by the burners 28 and 29.

For a drawing operation the burners are partially shut off so as to produce but a small amount of heat. The amount of heat produced is not sufficient to provide circulation of the gases throughout the furnace. The fan 37 is started and the damper 36 in the pipe 35 is opened. Thereupon the hot gases are withdrawn from the furnace and reintroduced into the furnace through the jets 40 and 41.

The introduction of the gases along the side walls of the furnace insures a uniform circulation of the gases in the furnace with a resulting uniform temperature throughout the furnace. By providing a secondary circulating system I am able to utilize the same furnace for normalizing and/or annealing operations and for a subsequent drawing operation.

It is to be understood that the secondary cooling system may be used with other systems of burners and that the system of burners may also be used without the secondary cooling system.

Figure 4:
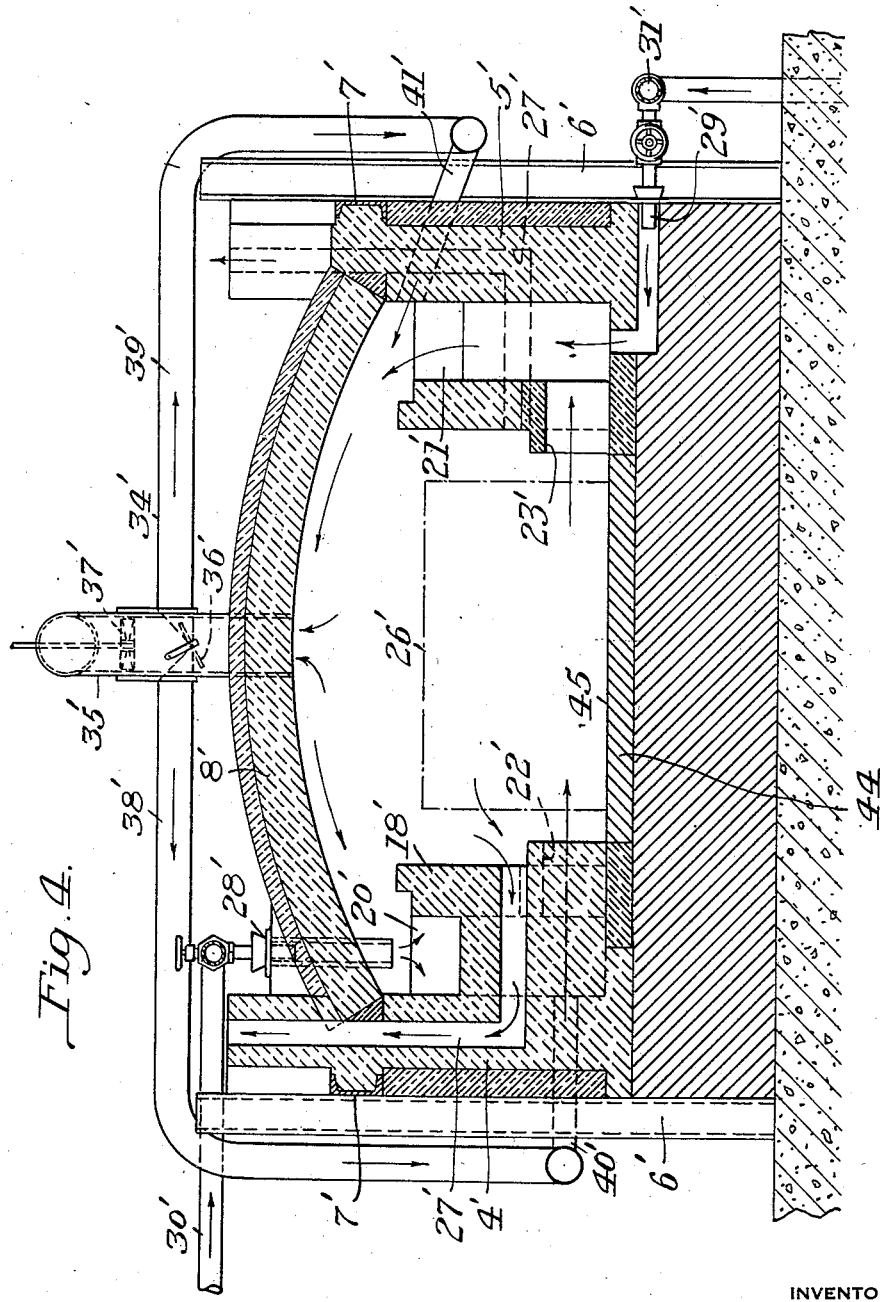
Figure 4 is a sectional view, similar to Figure 3, of a modified form of the invention.

Figure 4 illustrates a modified type of furnace having a stationary hearth instead of a hearth carried on a car. The furnace of Figure 4 is otherwise similar to that already described in detail and the same reference numerals, primed, are employed to designate corresponding parts. In Figure 4, the furnace hearth is indicated at 45 and comprises a brick lining 44 resting on a floor corresponding to that shown at 9 in Figure 3.

Referring to Figures 5, 6 and 7, I have illustrated a modified form of the invention in which the gases escaping from the furnace flues are re-introduced into the furnace and distributed into the cooler parts of the furnace with combustion gases. In this form of the invention a furnace 50, having burners 51 and 52 disposed therein and corresponding to the burners 28 and 29, respectively, cooperate with outlet flues 54 and 55, respectively, which correspond to outlet flues 27. In the form of the invention shown in Figures 1 to 3, the outlet flues 27 were illustrated as being open to the atmosphere. In the form of the invention shown in Figures 5, 6 and 7 the flues 54 and 55 terminate in headers 56 and 57, respectively. The headers 56 and 57 are connected to a common flue 58 leading to a stack 59 having a damper 60 therein. The flue 58 also communicates through a damper 61 with a header 62 having a suction fan 64 mounted therein. The suction fan 64 corresponds to the fan 37 shown in Figures 1 to 3, inclusive. The header 62 is connected by a pipe line 65 to a plurality of distributing ducts 66 extending into a passageway 67 corresponding to the space 21.

The header 62 is also connected by a pipe 68 to a plurality of vertically extending outlet pipes 69 extending downwardly into a space 70, corresponding to the space 20 in Figures 1 to 3, in substantial parallelism with the burners 51. With this form of the invention, when it is desired to reduce the temperature of the furnace, the damper 60 is moved to cut off a portion or all of the gases escaping through the stack 59. The damper 61 is opened and the fan 64 is set in motion. Gases are drawn from the flue 58 into the header 62 and distributed through the pipes 65 and 66, and 68 and 69, for circulating the gases in the furnace.

It is to be understood that when the flames from the burners 51 and 52 are sufficient to insure a uniform circulation of the gases in the furnaces, the second circulating system comprising the pipes 65 and 66, and 68 and 69, may be dispensed with.

In operating this form of the invention, the damper 61 is usually closed and the damper 60 open during a normalizing and/or annealing operation. For a subsequent drawing operation the damper 61 is wholly or partially closed and the damper 61 opened for circulating flue gases through the secondary circulating system constituted by the heater 62 and pipes 65 and 66, and 68 and 69.

While I have shown and described certain present preferred embodiments of the invention it is to be understood that the invention may be otherwise embodied and practiced within the spirit of the invention and the scope of the following claims.

I claim:

1. In a furnace, burners on each side for creating a circulation of hot gases around the furnace walls, an offtake at the top of the furnace, and means for returning gases from the offtake to both sides of the furnace in such direction as to aid said circulation.

2. In a furnace, burners on each side for creating a circulation of hot gases around the furnace walls, an offtake at the top of the furnace, means for returning gases from the offtake to both sides of the furnace in such direction as to aid said circulation, and exhaust passages at each side of the furnace.

3. In a furnace, burners on opposite sides thereof communicating with aligned burner passages for directing gases from the burner in a predetermined path, an offtake for removing gases from the top of the furnace, means for returning the removed gases to the furnace so as to assist circulation of the hot gases from the burners, and exhaust passages offset from said burner passages.

4. In a furnace, gas directing passages along each side thereof for creating a continuous circulation of gases around the walls of the furnace, burners for supplying hot gases to said passages, an offtake at the top of the furnace, and means for returning gases removed through the offtake to said passages to supplement the flow of gases created by the burners.

5. In a furnace, gas directing passages along each side thereof for creating a continuous circulation of gases around the walls of the furnace, burners for supplying hot gases to said passages, an offtake at the top of the furnace, means for returning gases removed through the offtake to said passages to supplement the flow of gases created by the burners, and exhaust passages on both sides of the furnace offset from said first mentioned passages.

In testimony whereof I have hereunto set my hand.

STRICKLAND KNEASS, Jr.